United States Patent Office 3,505,430
Patented Apr. 7, 1970

3,505,430
POLYOLEFIN COMPOSITIONS
Keith Jasper Clark and Annette La Touche Turner-Jones, Welwyn Garden City, and Rex Percival Palmer, Datchworth, Knebworth, England, assignors to Imperial Chemical Industries Limited, London, England, a corporation of Great Britain
No Drawing. Filed Oct. 29, 1965, Ser. No. 508,188
Claims priority, application Great Britain, Nov. 5, 1964, 45,119/64
Int. Cl. C08f 15/04, 15/40
U.S. Cl. 260—878
12 Claims

ABSTRACT OF THE DISCLOSURE

Polymeric compositions which are predominantly poly-4-methyl-hexene-1, poly-5-methyl-hexene-1 or poly-5, 5 dimethyl hexene-1 contain dispersed throughout up to 5% by weight of polymerized monomers of a 1-olefine whose homopolymer melts above 275° C. so as to produce a composition which, when compression moulded, has a mean spherulite size of less than 5 microns. A process for making such compositions in which the predominant olefin is polymerised sequentially with the 1-olefin melting above 275° C. in the presence of a stereospecific catalyst.

---

This invention relates to polyolefine compositions.

The object of the present invention is to provide polymer compositions of certain branched 1-olefines having finer crystalline texture than those previously available. A fine crystalline texture has various advantages which will appear hereinafter.

According to the present invention we provide an outstandingly fine crystalline texture polymeric composition, predominantly of a monomer (hereinafter referred to as the first component) selected from 4-methyl hexene-1, 5-methyl hexene-1 and 5,5-dimethyl hexene-1, having a melt flow index (measured by ASTM Method 1238–57T using a 5 kg. weight at 260° C.) of between 0.01 to 1000, and containing dispersed throughout the composition polymer of a second component which is an aliphatic 1-olefine, the homopolymer of which melts at above 275° C. and preferably at above 320° C., said polymer being present in a quantity and dispersed to a degree such that the polymeric composition has a mean spherulite size when quench compression moulded of not more than 5 microns. We also provide such a polymeric composition that has a low ash content, i.e. of less than 0.02%, containing second component polymer present in a quantity and dispersed to a degree such that the polymeric composition has a mean spherulite size when quench compression moulded of not more than 5 microns, a light transmission, measured by ASTM Test D1746–62T, of at least 90% and a haze, measured by ASTM Test D 1003–59T, of preferably less than 5% in ⅛" section. In such compositions of high transparency it is necessary that the polymer of the second component is present in quantity sufficiently low (e.g. generally less than 1% by weight) and/or is homogeneously dispersed throughout the composition to a sufficient extent, otherwise portions of polymer may reduce transparency by acting as light scattering centres. Dispersion processes should not cause the melt flow index as defined above of the composition to become greater than 1000 or preferably 500; unduly prolonged treatment at too high temperature must therefore be avoided.

Particularly suitable second components are 3-methyl pentene-1 and 4,4-dimethyl pentene-1 (both homopolymers melt at about 350° C.); 3-methyl butene-1, with homopolymer melting at 310° C., is also useful. 3-methyl hexene-1 and 3-ethyl pentene-1, whose homopolymers melt above 350° C., may also be employed, as also may vinylcyclohexane, whose homopolymer melts at 342° C.

The concentration of polymer of the second component present in the polymer compositions of this invention is generally less than 5% and preferably less than 1% and may be difficult to measure because infra-red measurement of it is not effective at concentrations of less than 0.5–1%. However, the presence of the said polymer in the compositions may readily be inferred when the second component has been present during the polymerization reaction and the polymer obtained has a mean spherulite size not more than 5 microns. Sometimes the concentration of second component may be calculated from the method used to manufacture the composition.

The invention also comprises a process for making compositions according to the invention which comprises sequentially polymerising a first component which is 4-methyl hexene-1, 5-methyl hexene-1 or 5,5-dimethyl hexene-1 with a second component which is an aliphatic 1-olefine, the homopolymer of which melts at above 275° C., and preferably at above 320° C., in the presence of a stereospecific catalyst.

The methods of carrying out the sequential polymerisation fall into two broad groups: (a) polymerising the second component before any substantial quantity of any other monomer has been polymerised, and (b) polymerising the second component subsequent to the polymerisation of another monomer or monomers. It is found that methods of group (a) do not generally give such a good dispersion of second component polymer throughout the composition as is obtained by methods of group (b), and in consequence the resulting compositions tend to have lower transparency, particularly at higher concentrations of second component. This disadvantage can be overcome to some extent by melt homogenisation of the resulting composition, e.g. in an extruder or other polymer compounding apparatus. Methods of group (a) have the advantage that they allow the step of polymerising the second component to be carried out in a separate preliminary stage. The second component generally polymerises more slowly than the first component, and it is required in the final composition only in very small proportions. If it is added for polymerisation after the first component, either a long additional polymerisation time will be required involving all the process ingredients and therefore a large reaction vessel, or it will be necessary to polymerise only part of a large excess of the second component and the separate unreacted second component from the diluent recovered. Both these alternatives are expensive.

It is therefore highly advantageous to carry out the polymerisation of the second component in a separate preliminary stage, since this may be done on a much smaller scale, where longer reaction times are much less expensive. Indeed, the polymerisation of the second component in this way may simply be regarded as an extra stage in the preparation of the catalyst for the polymerisation. Suitable amounts of second component to use in this preliminary stage may be from 10 to 1000% by weight of the catalyst.

The convenience of methods of group (a) can be combined to some extent with the improved dispersion obtained by methods of group (b) by initially polymerising first component or 4-methyl pentene-1 or a linear 1-olefine having from 4 to 18 carbon atoms in small amount, subsequently polymerising the second component and thereafter polymerising the bulk of the first component. Examples 2–4 following illustrate this procedure. As explained below, this may conveniently be done by contacting the catalyst in a first stage with a small amount of a mixture of second component and first component or 4-methyl pentene-1 or linear 1-olefine and subsequently contacting the catalyst with the bulk of the first component in a second stage.

Sequential polymerisation according to our invention does not necessarily require the first and the second component to be added to the polymerisation zone at different times. This is because the second components in general polymerise more slowly than the first components. In one method of carrying out the process of our invention, the first and the second components are both present together in the polymerisation zone and polymerisation is then carried out for a time sufficient to polymerise substantially all the first component and subsequently to polymerise at least some of the second component. This method clearly falls into group (b) above; it is illustrated by Example 1 below.

Reduction of the time for polymerising the second component may be effected by a variety of expedients such as adding this monomer at the time when its polymerisatioin is required, increasing the catalyst concentration, increasing the polymerisation temperature and/or increasing the catalyst activity by, for example, adding a small amount of oxygen to the polymerisation system.

The effect of relatively high concentrations of second component in reducing transparency varies with the particular second component used and the method by which the polymeric composition is made. Generally no trouble is found with any second component at levels of below 1% in the polymer. Above this level 3-methyl butene-1 tends to reduce transparency below the 90% light transmission level. 3-methyl pentene-1 and 4,4-dimethyl pentene are alike in their behaviour; when the polymer composition is made by methods of group (a) up to 2% by weight of these second components give compositions having light transmissions of the order of 90%, while when the polymer composition is made by methods of group (b) up to 4% by weight of these second components give light transmissions of the order of 90%. Above these limits the light transmissions of the polymer compositions fall off with increasing content of second component; but at levels below 5% these light transmissions are generally improved by melt homogenisation.

Polymer compositions according to the invention may be made by melt-homogenising mixtures of coarse-textured first component polymers with fine-textured first component polymers made according to the polymerisation process of the invention.

Besides the second component, the polymers of our invention may also optionally comprise a minor proportion of third component which is one or more linear 1-olefines having from 4 to 18 carbon atoms, e.g. hexene-1 or decene-1, preferably in an amount of up to 30% by weight. These three-component copolymers are in general as transparent as, and in many cases more transparent than, the two-component polymer compositions of our invention, and they can have other improved properties including a lower melting point and a wider melting range, thus resulting in greater ease of fabricating, and, in the case of linear 1-olefine contents above about 8% by weight, considerably increased flexibility.

It is convenient to use a stereospecific catalyst (as defined below) for polymerisation according to the process of the invention, for in this way a free-flowing slurry may be obtained which is easy to de-ash to the high degree desirable to give highly transparent polymer. By a stereospecific catalyst we mean one which under equivalent conditions will polymerise propylene to solid polypropylene which is at least 70% insoluble in boiling n-heptane. Numerous catalysts which will do this are known—each experienced worker in the art of low pressure olefine polymerisation will have his own preferred formulation. Many suitable catalysts are described in Gaylord and Mark "Linear and Stereoregular Addition Polymers," Interscience 1959. Generally these catalysts comprise a transition metal compound from Groups IV to VIII and an organometallic activator. Most widely used are those catalysts which comprise a titanium halide, e.g. titanium trichloride, activated by an organometallic aluminum compound, e.g. an aluminium trialykyl or alkyl chloride. We prefer to use the material obtained by reacting titanium tetrachloride with aluminium alkyl sesquichloride in a purified alkane medium with stirring in an inert atmosphere at about 0° C., preferably by adding a solution of the sesquichloride gradually (preferably dropwise) to a solution of the $TiCl_4$. The product so obtained may be washed with fresh hydrocarbon and submitted to one or more heat treatments between 60° and 150° C. before use. As activator for this material we prefer to use dialkyl aluminium chloride.

Polymerisation is carried out in the absence of air and water, or in the presence of only limited amounts of these, since in other than small concentrations both air and water de-activate the catalyst. Conveniently an inert hydrocarbon is used as polymerisation medium. Nitrogen is often used to purge the apparatus beforehand. Where three-component copolymers are to be made, various techniques are available for copolymerising the monomers. Butene-1 boils at −5° C., pentene-1 at 30° C., hexene-1 at 63° C. and heptene-1 at 93° C.; the higher linear 1-olefines all boil above 100° C. Superatmospheric pressure may be used. Hydrogen may be used to reduce the molecular weight and increase melt flow index of the polymer composition.

The addition of the third components may be made in a random manner by passing the first component and third component into the reaction vessel at predetermined rates so that the concentration of both in the reaction mixture is constant throughout. Alternatively, the third component may be added in one or more controlled periods, such periods being at spaced intervals. It is usually not easy to obtain the polymer compositions of this invention in the form of free-flowing slurries, convenient to handle. The higher the temperature and the more third component there is present, the greater is the tendency for a gel or solution rather than a slurry to form. Beginning polymerisation with first or second component (or 4-methyl pentene-1) in the absence of any third component and at a relatively low temperature gives the best chance of obtaining a free-flowing slurry. It may be convenient to form between 1 and 15% by weight of the total amount of the composition in this way before any third component is added.

De-ashing of the polymer reaction mixture obtained by polymerisation is preferably carried out using dry reagents; if reagents containing water or aqueous extraction processes are used, the polymer obtained often shows an undesirable "blue haze" and may not be of the highest transparency. De-ashing may be carried out in two main ways. One is by adding a small quantity of reagent to the reaction mixture (if the reaction mixture is a solution this will generally serve to precipitate polymer from it), digesting for a period at a moderate temperature, e.g. between 20° and 60° C., followed by filtration and washing with more de-ashing reagent or hydrocarbon or mixtures of the two. The other is first to separate all or most of the polymerisation diluent from the polymer produced and then to re-slurry the polymer one or more times in de-ashing reagent. In the first process the most suitable types of de-ashing reagents are the hydrocarbon-miscible alcohols such as isopropanol, n-butanol or isobutanol, or the higher alcohols such as 3,5,5-trimethyl hexanol and isodecanol and higher acids and amines such as n-nonoic acid and 3,5,5-trimethylhexylamine. Particularly effective are mixtures of alcohols with complex-forming carbonyl compounds, such as isopropanol mixed with acetyl-acetone. In the second process it is of particular advantage to use the lower alcohols, such as methanol and ethanol, because of their cheapness.

We believe that true block copolymers, i.e. materials containing two or more linked segments of different polymer chains, are generally not formed, or not formed to any substantial degree, during sequential polymerisation according to our invention. However, whether this is so or not is irrelevant to the operation of our invention and to the advantages obtainable thereby.

The polymer composition made by our invention may be manufactured into articles by a variety of known techniques, e.g. extrusion, injection moulding, compression moulding and blow-moulding. Their fine crystalline texture has numerous advantages. The tendency to void formation in moulding is reduced. Also the transparency of articles made from the highly transparent compositions of low ash content is materially increased and is very much less dependent on rate of cooling from the melt than is the case with similar homopolymers or copolymers of coarser texture. Moreover, the crystallisation rate is increased and hence moulding cycle time is reduced. Very useful transparent bottles may be made from the highly transparent polymer compositions by blow-moulding; numerous other transparent articles may be made by injection moulding, blow-moulding or extrusion. Three-component copolymers may vary in mechanical properties according to the amount of third component which they contain; those which contain only 1 or 2% of third component are relatively rigid, while higher amounts of third component make the copolymer progressively more flexible. Higher 1-olefines increase flexibility more than lower 1-olefines. Sheet, fibres and films may be made from the polymer composition.

Homopolymers of 4-methyl hexene-1, 5-methyl hexene-1 and 5,5-dimethyl hexene-1 containing no second or third component give ⅛″ thick quenched, well crystalline, compression mouldings having mean spherulite sizes in the range 15–40$\mu$, and light transmissions in the range 70–80%.

In the following examples the compression mouldings are made in the following way. The dried polymer obtained is placed in a preform and compression moulded under a pressure of 20 tons/square inch for five minutes. The temperature used in compression moulding depends on the nature of the polymer composition. If it consists mainly of 4-methyl hexene-1 or 5,5-dimethyl hexene-1 monomer units, a temperature of from 265° C. to 280° C. is usually convenient; if it consists mainly of 5-methyl hexene-1 monomer units a temperature of from 200° C. to 250° C. is preferred. The moulding is then removed from the press and either immediately quenched by plunging into water at room temperature or allowed to cool slowly in the press.

Average spherulite sizes are measured by photomicrography of the specimen using polarised light. The mean sperulite size is taken from measurements of the diameters of about 100 spherulites. Light transmissions were measured by ASTM Test D 1746–62 and hazes by ASTM Test D 1003–61.

The titanium chloride used in the examples was prepared by reaction of $TiCl_4$ and aluminium ethyl sesquichloride in a purified hydrocarbon fraction (boiling range 170–200° C.). A solution of the sesquichloride was added gradually drop by drop, with stirring, to a solution of $TiCl_4$ in the same solvent over a period of several hours, the temperature being held at 0° C. The molar ratio of total aluminium to titanium was approximately 1.6. The resulting slurry containing $TiCl_3$ was heated for a period at 85° C. It was introduced into the polymerisation vessel in the form of a slurry in hydrocarbon.

The following examples illustrate our invention but do not limit it in any way.

EXAMPLE 1

Under air- and water-free conditions a stirred mixture of a high boiling paraffin fraction (1 litre), aluminium diethyl chloride (36 millimoles) and titanium trichloride (12 millimoles) was added to 168 mls. of a 2% by volume solution of 3-methyl pentene-1 in 4-methyl hexene-1 at 60° C. Further quantities of the monomer mixture were added at a rate of 150 mls./hr. over 2 hours. At the end if this time the temperature of the reaction mixture was raised to 70° C. and polymerisation continued without further addition of monomer. A sample was taken after a further three hours and subsequently at further intervals of two hours and each sample worked up by treatment with excess of a solution of dry acetylacetone in dry isopropanol and washing of the isolated polymer with dry isopropanol before drying at 70° C. in a vacuum oven. Infrared analysis indicated that <1% 3-methyl pentene-1 units were present in the composition. The polymer samples were compression moulded at 280° C. and quenched. Mouldings were examined for spherulite size. Results are shown in Table 1. It was found that after nine hours polymerisation time only polymer giving fine-textured fabrications was obtained. All the mouldings made from samples taken after nine hours had light transmission over 90% and haze less than 5% in ⅛″ section.

TABLE 1

| Polymerisation time (hours) | Spherulite size ($\mu$) | | |
|---|---|---|---|
| | Max. | Mean | Min. |
| 5 | 50 | 25 | <1 |
| 7 | 10 | 7 | <1 |
| 9 | 6 | 4 | <1 |
| 11 | 3 | 2 | <1 |
| 13 | 2 | 1 | <1 |
| 15 | 1 | 1 | <1 |

EXAMPLES 2–4

For Examples 2, 3 and 4, a titanium trichloride catalyst as used in Example 1 was pretreated at 20° C. under polymerising conditions, first with 4-methyl pentene-1 and thereafter with 3-methyl pentene-1 so that each millimole of titanium trichloride became associated with 0.58 g. poly-4-methyl pentene-1 and 0.037 g. poly-3-methyl butene-1.

In each example, 20 g. of first component monomer was dissolved in 80 mls. of a purified high boiling petrol fraction, and treated with aluminium diethyl chloride (6 millimoles) and pretreated titanium trichloride prepared as above (2 millimoles). Polymerisation was begun at 30° C. and subsequently completed at 50° C. The polymerisations were then each terminated by the addition of a mixture of dry isopropanol (20 mls.) and acetylacetone (15 mls.) at 50° C. Repeated washing of the polymers with hot dry isopropanol was followed by drying at 60° C. in a vacuum oven. Ash contents were in all cases below 0.02% by weight.

The conditions and results are set out in Table 2.

TABLE 2

| Example | First Component | Yield of Polymer (g.) | Weight percent poly-3-methyl pentene-1 (estimated) | Polymerisation Time (hours) | | Quenched 1⁄16″ Compression Mouldings | | |
|---|---|---|---|---|---|---|---|---|
| | | | | At 30° C. | At 50° C. | Moulding Temperature, ° C. | Light Transmission, percent | Mean Spherulite Size ($\mu$) |
| 2 | 4-methyl hexene-1 | 18 | 0.4 | 15 | 95 | 260 | 92 | 3–4 |
| 3 | 5,5-dimethyl hexene-1 | 17 | 0.4 | 2 | 25 | 260 | 84 | 3–4 |
| 4 | 5-methyl hexene-1 | 20 | 0.4 | 20 | 90 | 220 | | 4 |

We claim:
1. A polymeric composition made up predominantly of a first component which is a polymeric 4-methyl hexene-1, 5-methyl hexene-1 or 5,5-dimethyl hexene-1, having a melt flow index measured by ASTM Method 1238–57T using a 5 kg. weight at 260° C. of between 0.01 and 1,000, and having an ash content below 0.02% and containing dispersed throughout the composition up to 5% by weight of polymer units consisting essentially of a second component which is a branched aliphatic mono-alpha olefin or vinyl cyclohexane, the homopolymer of which melts at above 275° C., said second component polymer being present in a quantity and dispersed to a degree such that the polymeric composition has a mean spherulite size when quench compression moulded from 265–280° C. of not more than 5 microns, and a light transmission, measured by ASTM Test D 1746–62T, of at least 90% in 1/8 inch section, said composition prepared by sequentially polymerizing said first and second components in the presence of a stereospecific catalyst.

2. A composition as claimed in claim 1 having a haze in 1/8 inch section, measured by ASTM Test 1003–59T, of less than 5%.

3. A composition as claimed in claim 1 having a content of second component polymer units below 1% by weight.

4. A composition as claimed in claim 1 wherein the second component is such that its homopolymer melts above 320° C.

5. A composition as claimed in claim 1 which contains up to 30% by weight of monomer units of a third component which is an unsubstituted linear aliphatic mono-alpha olefin having from 4 to 18 carbon atoms.

6. A composition as claimed in claim 5 containing at least 2% by weight of monomer units of the third component.

7. A composition as claimed in claim 5 containing at least 8% by weight of monomer units of the third component.

8. A composition as claimed in claim 2 wherein the second component is selected from the group consisting of 3-methyl pentene-1, 3-methyl butene-1 or 4,4-dimethyl pentene-1, 3-methyl hexene-1, 3-ethyl pentene-1 and vinylcyclohexane.

9. A composition as claimed in claim 1 wherein the first component is 4-methyl hexene-1.

10. A composition as claimed in claim 1 having a melt index of from 0.01 to 500.

11. A shaped article made from a composition claimed in claim 1.

12. A filament or film made from a composition claimed in claim 1.

References Cited

UNITED STATES PATENTS

| | | | |
|---|---|---|---|
| 3,322,739 | 5/1967 | Hagenmeyer et al. | 260—88.2 |
| 3,405,108 | 10/1968 | Clark | 260—88.2 |
| 3,329,741 | 7/1967 | Schrage et al. | 260—878 |

FOREIGN PATENTS

| | | |
|---|---|---|
| 1,349,361 | 12/1963 | France. |
| 848,741 | 9/1960 | Great Britain. |
| 957,777 | 5/1964 | Great Britain. |

MURRAY TILLMAN, Primary Examiner

M. J. TULLY, Assistant Examiner

U.S. Cl. X.R.

260—875, 896, 897